(12) United States Patent
Lee

(10) Patent No.: US 6,829,495 B2
(45) Date of Patent: Dec. 7, 2004

(54) BATTERY PACK LOCKING APPARATUS FOR A MOBILE TELEPHONE

(75) Inventor: Jung-Chul Lee, Yongin-shi (KR)

(73) Assignee: Samsung Electronics Co., LTD (KR)

(*) Notice: Subject to any disclaimer, the term of this patent is extended or adjusted under 35 U.S.C. 154(b) by 729 days.

(21) Appl. No.: 09/759,813

(22) Filed: Jan. 11, 2001

(65) Prior Publication Data

US 2001/0007823 A1 Jul. 12, 2001

(30) Foreign Application Priority Data

Jan. 11, 2000 (KR) .......................................... 2000-1163

(51) Int. Cl.[7] .............................................. H04B 1/38
(52) U.S. Cl. .............................. 455/575.1; 379/433.08; 379/573
(58) Field of Search ................................ 455/90, 575.1, 455/573, 346; 320/112, 110, 114; D13/108; 429/96, 100; 220/324, 345.2, 345.3; 379/433.08

(56) References Cited

U.S. PATENT DOCUMENTS 5,935,729 A * 8/1999 Mareno et al. ............. 429/100
5,960,332 A * 9/1999 Michalzik ................ 455/575.1

* cited by examiner

Primary Examiner—Nick Corsaro
Assistant Examiner—Tu X Nguyen
(74) Attorney, Agent, or Firm—Dilworth & Barrese LLP

(57) ABSTRACT

A battery pack locking apparatus for a mobile telephone is disclosed, in which a locker is operable with its own mechanical structure without using a separate spring. The battery pack locking apparatus includes a locker movable in a perpendicular direction with respect to a body of the mobile telephone and mounted on a lower casing frame of the mobile telephone, and an elastic member formed on a lower surface of the locker to provide a restitution force to the locker. The elastic member is a zigzag tension rib, which is formed extending downward from the lower surface of the locker such that a free end of the tension rib should be pressingly contact the lower casing frame.

5 Claims, 4 Drawing Sheets

BATTERY PACK LOCKING APPARATUS FOR A MOBILE TELEPHONE

PRIORITY

This application claims priority to an application entitled "Battery Pack Locking Apparatus for a Mobile Telephone" filed in the Korean Industrial Property Office on Jan. 11, 2000 and assigned Serial No. 2000-1163, the contents of which are hereby incorporated by reference.

BACKGROUND OF THE INVENTION

1. Field of the Invention

The present invention relates generally to a battery pack locking apparatus for a mobile telephone, and in particular, to a battery pack locking apparatus in which a locker is operable with its own mechanical structure without using separate elastic means.

2. Description of the Related Art

In general, a mobile terminal such as a mobile telephone has a battery pack detachably mounted on the rear side of its body as a power source. The battery pack is locked by a locking apparatus mounted on the body of the mobile telephone, and at least one guide rib is formed on the body to guide the battery pack.

In addition, the battery pack has electrodes formed on the inner and outer surfaces of its lower portion. The electrodes formed on the inner surface of the battery pack are so structured as to contact the connection terminals formed on the rear surface of the body of the mobile telephone. Further, the electrodes formed on the outer surface of the battery pack are so structured as to contact the connection terminals of a charger during charge.

FIG. 1 is a perspective view illustrating the rear side of a general mobile telephone, with a battery pack detached from a body of the mobile telephone. FIG. 2 is a partial plane view illustrating the battery pack locking apparatus of FIG. 1.

Referring to FIGS. 1 and 2, the mobile telephone includes a body 100 comprised of an upper casing frame 101 and a lower casing frame 102, and a battery pack 200 detachably mounted on the rear side of the body 100. The lower casing frame 102 has a plane surface 103 formed on its rear side, and the plane surface 103 has connection terminals protuberantly formed at one end and a locking apparatus 105 mounted on another end, for fixedly attaching the battery pack 200 to the lower casing frame 102. In addition, the plane surface 103 has guide ribs 104 formed on its both sides to guide the battery pack 200 to the locking apparatus 105, and the battery pack 200 also has guide ribs 204 formed on its both sides to be combined with their associated guide ribs 104 on the plane surface 103. In such a mobile telephone, the battery pack 200 is attached to and detached from the lower casing frame 102 in the direction "B", and a locker 105 for locking the battery pack 200 operates in the direction "A".

FIG. 3 is a cross-sectional view illustrating a conventional battery pack locking apparatus for the mobile telephone.

Referring to FIG. 3, a locker 105 includes a hook (106 of FIG. 1) formed to be hooked at a hooking groove (not shown) formed on the front side of the battery pack 200, at least one guide rib 107 mounted on the lower casing frame 102 to guide the locker 105 perpendicularly, and a spring pin 108 for supporting a spring 109, the spring pin 108 extending downward from the center of the locker 105. The guide rib 107 has a hook 107a formed at one end to be hooked at a hooking member 102a formed on the lower casing frame 102, to thereby prevent the locker 105 from being detached from the lower casing frame 102 during its up-and-down movement. The spring pin 108 is mounted on the lower surface of the locker 105 such that it should freely pass through a guide hole 102b formed in the lower casing frame 102, to thereby prevent interference with the up-and-down movement of the locker 105.

However, the conventional battery pack locking apparatus uses the separate spring for the elastic means. Use of the spring unavoidably increases the number of assembling processes, making the assembling process complicated.

SUMMARY OF THE INVENTION

It is, therefore, an object of the present invention to provide a battery pack locking apparatus for a mobile telephone, which has a structure with a reduced number of assembling processes.

It is another object of the present invention to provide a battery pack locking apparatus for a mobile telephone, in which a locker is operable with its own mechanical structure without using a separate element.

To achieve the above and other objects, there is provided a battery pack locking apparatus for a mobile telephone. The battery pack locking apparatus includes a locker up-and-down movably mounted on a lower casing frame of the mobile telephone, and an elastic member formed on a lower surface of the locker to provide a restitution force to the locker.

Preferably, the elastic member is a zigzag tension rib, which is formed extending downward from the lower surface of the locker such that a free end of the tension rib should be pressingly in contact with to the lower casing frame.

Preferably, the lower casing frame has a plane surface with which the free end of the tension rib pressingly contacts.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 4:
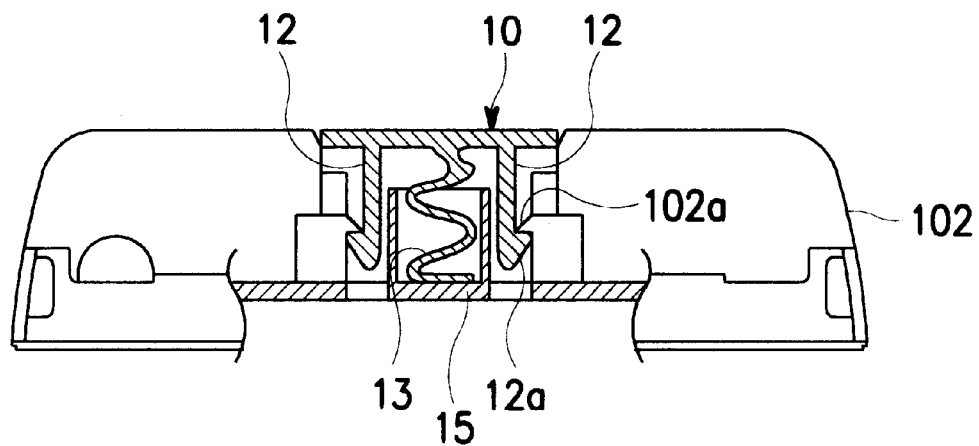
FIG. 4 is a cross-sectional view illustrating a battery pack locking apparatus for a mobile telephone according to an embodiment of the present invention.
Figure 5:
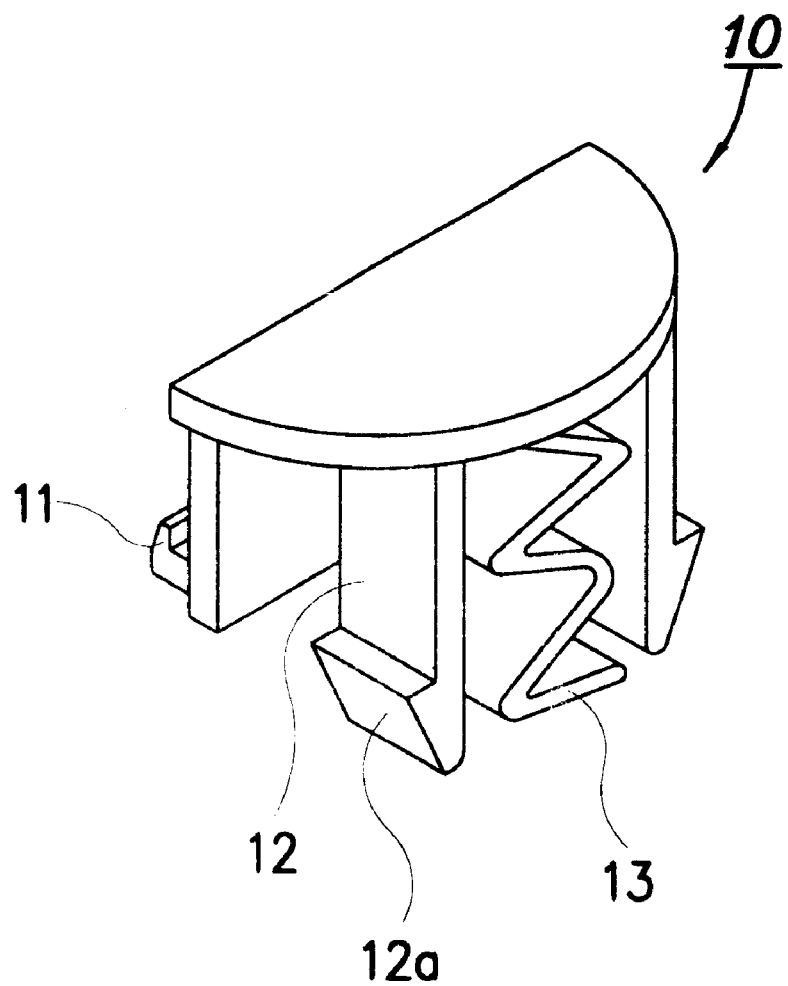
FIG. 5 is a perspective view illustrating the battery pack locking apparatus according to an embodiment of the present invention.

FIG. 4 is a cross-sectional view illustrating a battery pack locking apparatus for a mobile telephone according to an embodiment of the present invention, and FIG. 5 is a perspective view illustrating the battery pack locking apparatus according to an embodiment of the present invention.

Figure 1:
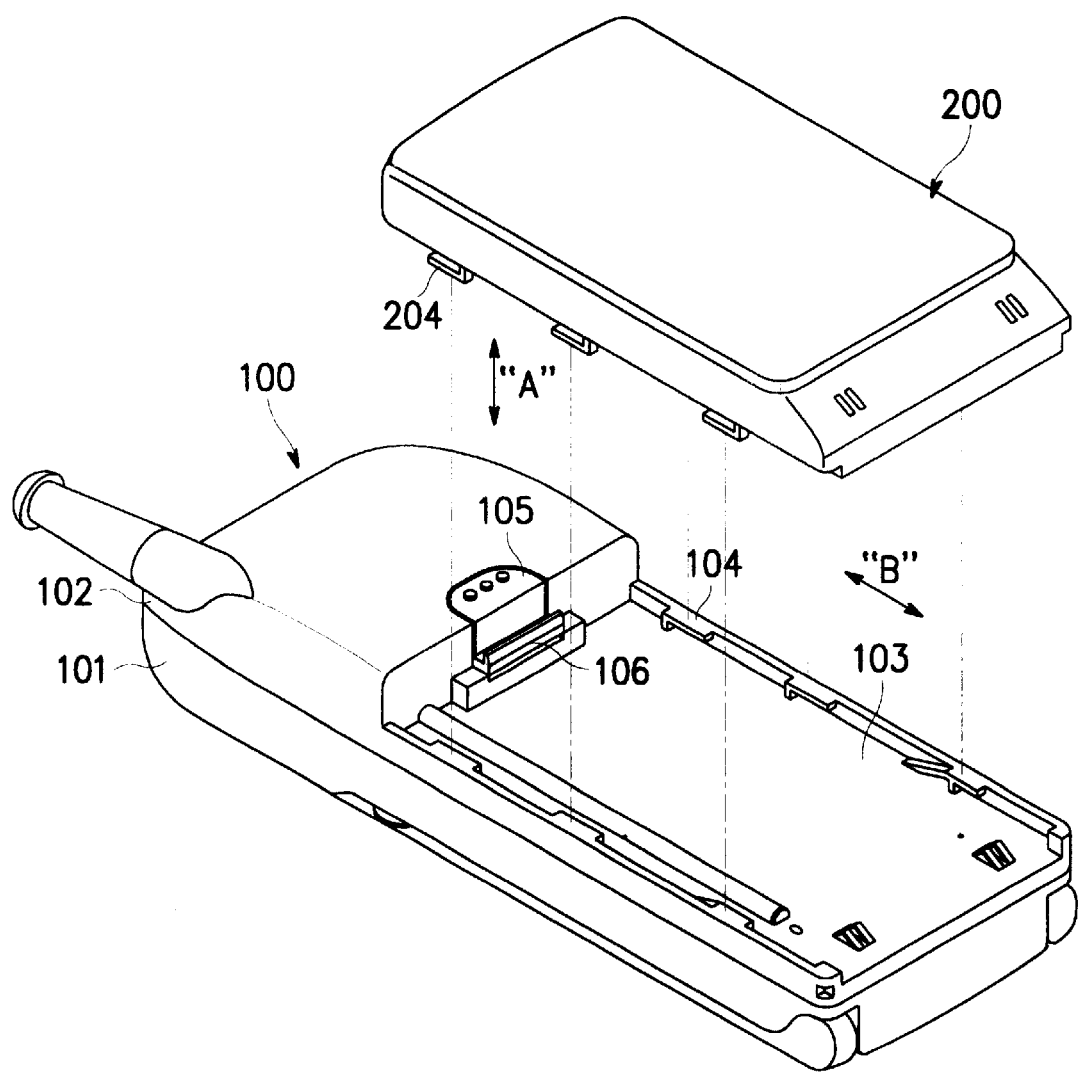
FIG. 1 is a perspective view illustrating a rear side of a general mobile telephone.
Figure 2:
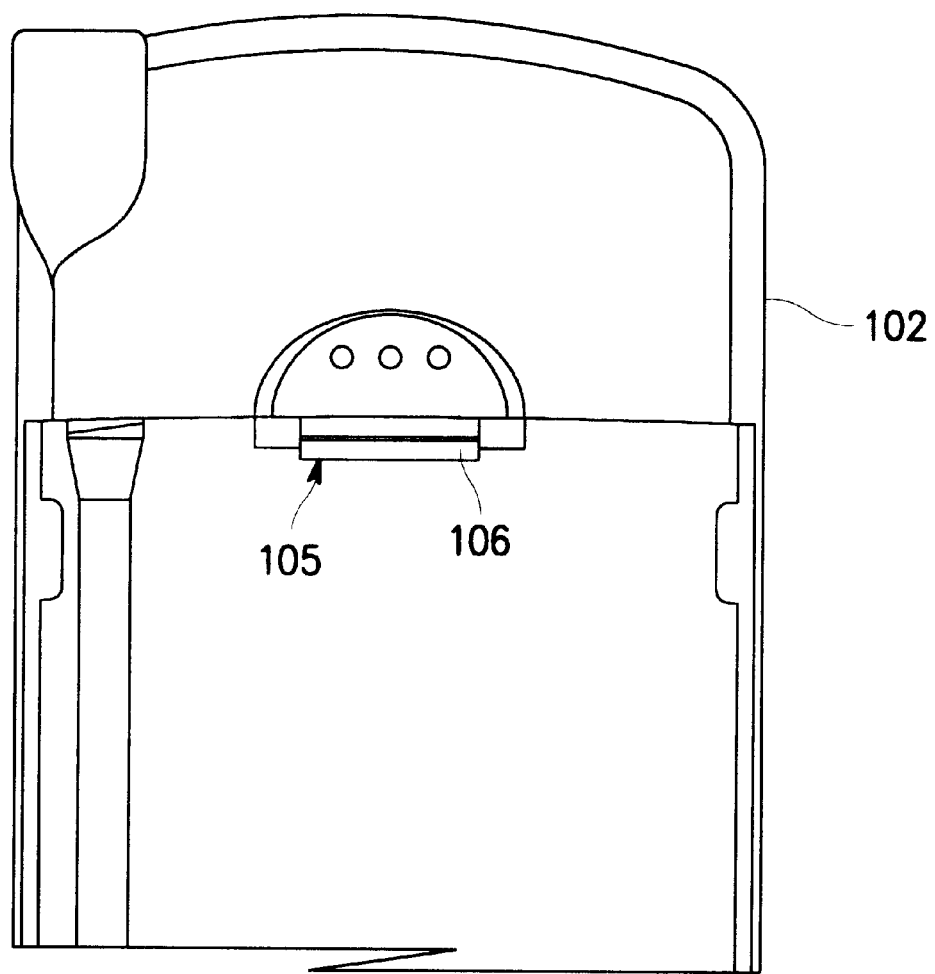
FIG. 2 is a plane view illustrating the battery pack locking apparatus of FIG. 1.
Figure 3:
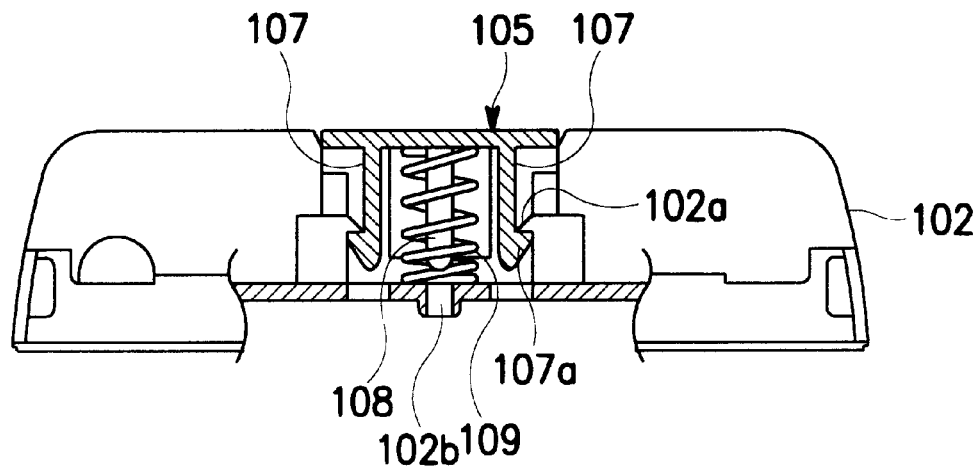
FIG. 3 is a cross-sectional view illustrating a conventional battery pack locking apparatus for a mobile telephone.

Referring to FIG. 4, a battery pack locking apparatus for a mobile telephone according to an embodiment of the present invention includes a locker 10 which is movable in a perpendicular direction with respect to the body of the mobile telephone and is mounted on the lower casing frame 102. The locker 10 serves to lock and release the battery pack 200 (not shown) to and from the rear side of the mobile telephone (see FIG. 1). The locker 10 must be firmly mounted on the lower casing frame 102 such that it can freely move up and down without seceding from the lower casing frame 102.

As shown in FIGS. 4 and 5, the locker 10 extends downward by a specific length so as to be guided along the lower casing frame 102. The locker 10 has at least one guide rib 12 formed to prevent the locker 10 from seceding from the lower casing frame 102. The guide rib 12 has a hook 12*a* formed at one end such that the hook 12*a* should be engaged with the hooking member 102*a* formed on the lower casing frame 102, thereby preventing secession of the locker 10.

In addition, the locker 10 has a hook 11 protuberantly formed such that the hook 11 should be hooked at a hooking groove (not shown) formed on the front side of the battery pack 200 when the locker 10 is installed in the lower casing frame 102.

Further, the locker 10 has an elastic member 13 formed on its lower surface to provide restitution force for restoring the locker 10 to the original state after being pressed by the user. The elastic member 13 is formed in one body with the locker 10 by injection molding. For example, as shown in FIG. 5, for the elastic member 13, a zigzag tension rib is formed in one body with the locker 10 such that a free end of the tension rib should pressingly contact with a plane surface 15 formed on the lower casing frame 102. It is preferable to form a pair of the guide ribs 12 on the lower surface of the locker 10. Further, it is preferable that the tension rib 13 should be formed extending downward from the center of the locker 10.

As described above, the battery pack locking apparatus for a mobile telephone according to an embodiment of the present invention can elastically support the locker with its mechanical structure without using separate elastic means, so that the battery pack locking apparatus can be assembled with a reduced number of assembling processes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A battery pack locking apparatus for a mobile telephone, comprising:

a locker movable in a perpendicular direction with respect to a body of the mobile telephone being mounted on a lower casing frame of the mobile telephone; and an elastic member integrally formed on a lower surface of the locker to provide a restoring force to the locker to return the locker to an original position relative to the body of the mobile telephone, wherein the elastic member extends downward from a lower surface of the locker such that a free end remains pressingly in contact with the lower casing frame.

2. The battery pack locking apparatus as claimed in claim 1, wherein the elastic member is a tension rib.

3. The battery pack locking apparatus as claimed in claim 2, wherein the lower casing frame has a planar surface with which the free end of the tension rib pressingly contacts.

4. The battery pack locking apparatus as claimed in claim 2, wherein the tension rib has a zigzag cross-sectional shape.

5. The battery pack locking apparatus as claimed in claim 1, further comprising a pair of guide ribs formed on the lower surface of the locker, wherein the elastic member is formed between the guide ribs.

* * * * *